(12) United States Patent
Franke et al.

(10) Patent No.: US 7,187,541 B2
(45) Date of Patent: Mar. 6, 2007

(54) MEDIA DRIVE CAGE HAVING IMPROVED INSERTION SHOCK AND AIR FLOW PROPERTIES

(75) Inventors: Greg Franke, Houston, TX (US); Kenneth Frame, Spring, TX (US); Greg Renfro, Houston, TX (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 230 days.

(21) Appl. No.: 10/698,682

(22) Filed: Oct. 31, 2003

(65) Prior Publication Data

US 2005/0094367 A1 May 5, 2005

(51) Int. Cl.
*G06F 1/16* (2006.01)

(52) U.S. Cl. .................................................... 361/685

(58) Field of Classification Search ............... 361/684, 361/685, 727; 312/223.1
See application file for complete search history.

(56) References Cited

U.S. PATENT DOCUMENTS 5,142,447 A * 8/1992 Cooke et al. ............... 361/685
6,299,266 B1 * 10/2001 Justice et al. ............ 312/223.2
6,373,694 B1 * 4/2002 Chang ........................ 361/685
6,813,148 B2 * 11/2004 Hsu et al. ................... 361/685
6,853,549 B2 * 2/2005 Xu ............................. 361/685
2004/0075978 A1 * 4/2004 Chen et al. ................. 361/685

* cited by examiner

*Primary Examiner*—Anatoly Vortman
*Assistant Examiner*—Corey Broussard
(74) *Attorney, Agent, or Firm*—Kevin M. Hart

(57) ABSTRACT

A slot in a media drive cage receives a protrusion of a media drive housing. A spring adjacent to the slot engages the protrusion just before it reaches the end of the slot, causing the media drive to slow down prior to reaching a fully engaged position within the cage. The frictional slowing reduces mechanical shock to the drive when its movement stops. A resilient finger at the end of the slot further reduces shock. A resilient latch retains the drive within the slot. To remove the drive, the latch may be disengaged by pulling on a hook portion of the latch. The slot may be nonlinear to enable airflow through the slot and over the drive, thus facilitating cooling of the drive.

19 Claims, 16 Drawing Sheets

MEDIA DRIVE CAGE HAVING IMPROVED INSERTION SHOCK AND AIR FLOW PROPERTIES

FIELD OF THE INVENTION

This invention relates generally to techniques for inserting and mounting media drives in a computer chassis.

BACKGROUND

Media drives for computers include a wide variety of devices such as disk drives, optical drives and tape drives. Many such drives—particularly hard disk drives—are sensitive to forces caused by mechanical shocks. Consequently, the drives may be damaged or destroyed if they are not handled carefully.

One common scenario in which media drives are frequently damaged is during installation of the drives into a computer chassis. During manufacture, each drive is usually slid into a cage or frame of some kind, which cage or frame is fixed to the inside of the computer chassis. Because incentives exist for fast production, the drives are sometimes inserted into the cage or frame with high force in order to install them quickly. But the high insertion force causes a high mechanical shock when the drive suddenly stops moving after reaching its engaged position in the cage or frame. Such high mechanical shocks can damage the drive, resulting in a failure of the computer when power is initially applied.

SUMMARY OF THE INVENTION

A media drive cage according to a preferred embodiment of the invention has improved insertion shock and air flow properties.

In one aspect, a first slot in the cage may be configured to receive a first protrusion of a media drive housing. The slot defines a plane of movement as the protrusion travels through it. A first spring disposed adjacent to the slot engages the protrusion as it travels; but, in response to force exerted by the protrusion, the spring deflects outward in a direction orthogonal to the plane of movement. The spring engages the protrusion just before it reaches the end of the slot, causing the media drive to slow down prior to reaching a fully engaged position within the cage. This frictional slowing reduces mechanical shock to the drive when its movement stops.

In another aspect, a resilient finger disposed at the end of the first or a second slot engages a protrusion of the drive when the drive reaches its fully inserted position, thus further reducing mechanical shock.

In another aspect, a second spring may engage a protrusion of the drive as the drive enters one of the slots. The second spring causes additional slowing of the drive during insertion. In addition, the second spring engages a protrusion of the drive when the drive has reached its fully engaged position in the cage. The engagement of the second spring with the protrusion helps to stabilize the drive in its inserted position, and dampens vibrations that may occur after the drive has reached its inserted position.

In another aspect, a resilient latch maybe disposed adjacent to one of the slots in the cage. When the drive reaches its inserted position, a protrusion of the drive engages the latch. The latch retains the drive within the cage. To remove the drive, the latch may be disengaged from the protrusion by pulling on a hook portion of the latch.

In yet another aspect, the slots may be nonlinear, including a high section between two low sections such that the high section clears the profile of the drive housing after it reaches its inserted position. The high section allows air to flow through the sides of the cage and over the drive, thus facilitating better cooling for the device.

DETAILED DESCRIPTION OF THE PREFERRED EMBODIMENTS

Figure 1:
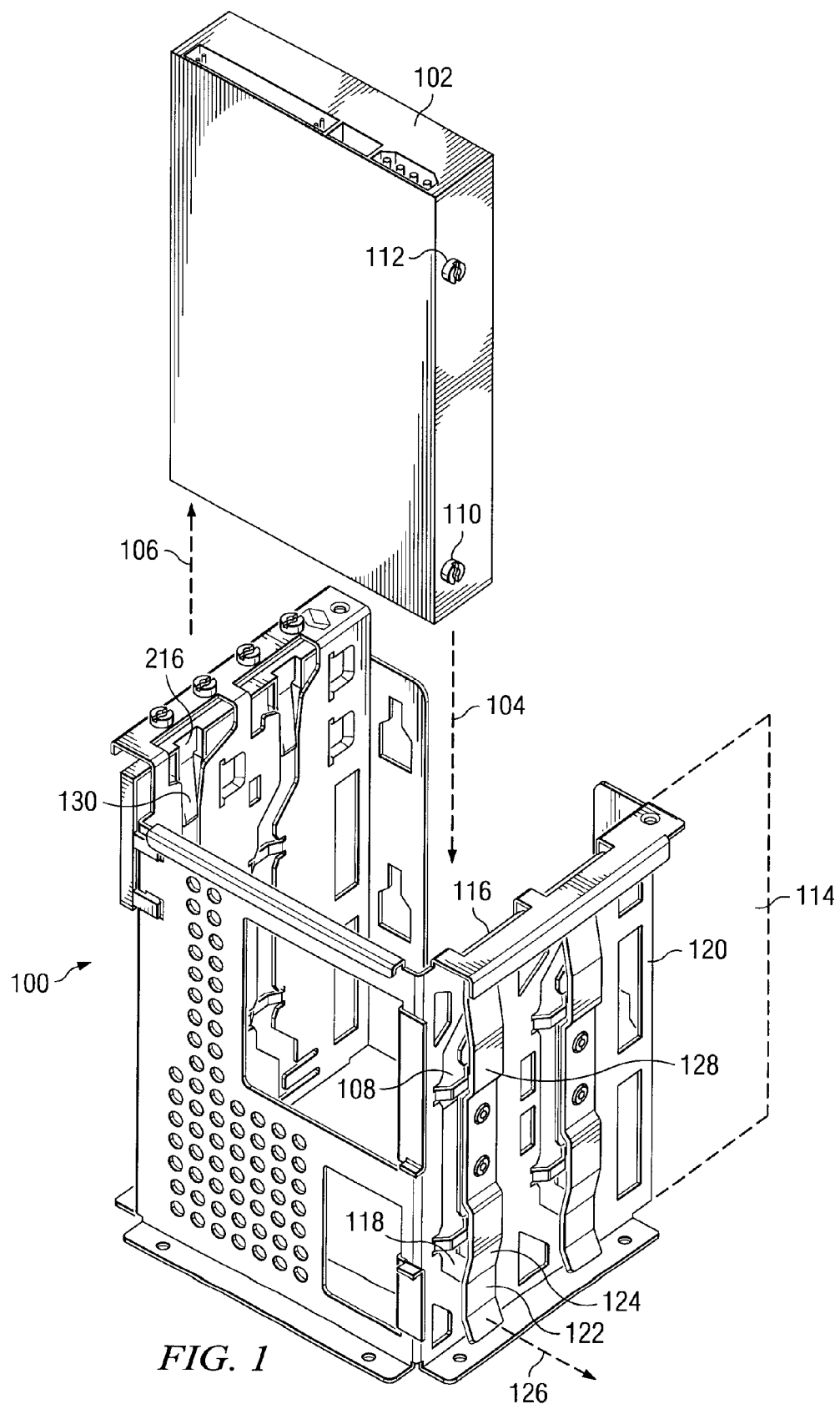
FIG. 1 is an oblique view of a media drive cage according to a preferred embodiment of the invention wherein the cage is shown disposed to receive a media drive.

FIG. 1 illustrates a media drive cage 100 according to a preferred embodiment of the invention. A media drive 102, such as a disk drive, optical drive, tape drive or the like, is shown poised above cage 100. Drive 102 may be inserted into cage 100 in direction of insertion 104, or removed from cage 100 in direction of removal 106. Cage 100 may be constructed using any suitable material such as sheet metal. In the embodiment shown, cage 100 houses two identical drive bays. In alternative embodiments, cage 100 may house a single drive bay or more than two drive bays.

A slot 108 is formed in cage 100 and is configured to receive protrusions 110, 112 extending from drive 102. In the embodiment shown, protrusions 110, 112 are the heads of mounting screws fastened to drive 102. In alternative embodiments, other similar protrusions may be used.

Slot 108 defines a plane of movement 114 for protrusions 110, 112 as they move along a path through the slot from an opening 116 to a termination 118. In the embodiment shown, the plane of movement is the same as the plane of side 120 of cage 100, as the slot is formed in the side of the cage. In other embodiments, the plane of movement need not be coplanar with the side of the cage.

A spring 122 is disposed adjacent to termination 118. Spring 122 is biased toward slot 118 and is operable to engage protrusion 110 when it reaches termination 118 during drive insertion. Preferably, spring 122 includes an engagement member 124 disposed at least partially in the path of protrusion 110. In the embodiment shown, engagement member 124 is a substantially flat surface oriented to the path obliquely. (That is, the surface is inclined relative to the directions of insertion and removal 104, 106.) The inclination of engagement member 124 facilitates deflection of the member away from the slot in a direction 126 orthogonal to the plane of movement 114 in response to force applied by protrusion 112. During drive insertion, this force is applied by protrusion 112 just before it reaches termination 118. The result is a frictional slowing of drive 102 so that mechanical shock is reduced when protrusion 112 engages termination 118.

Figure 2:
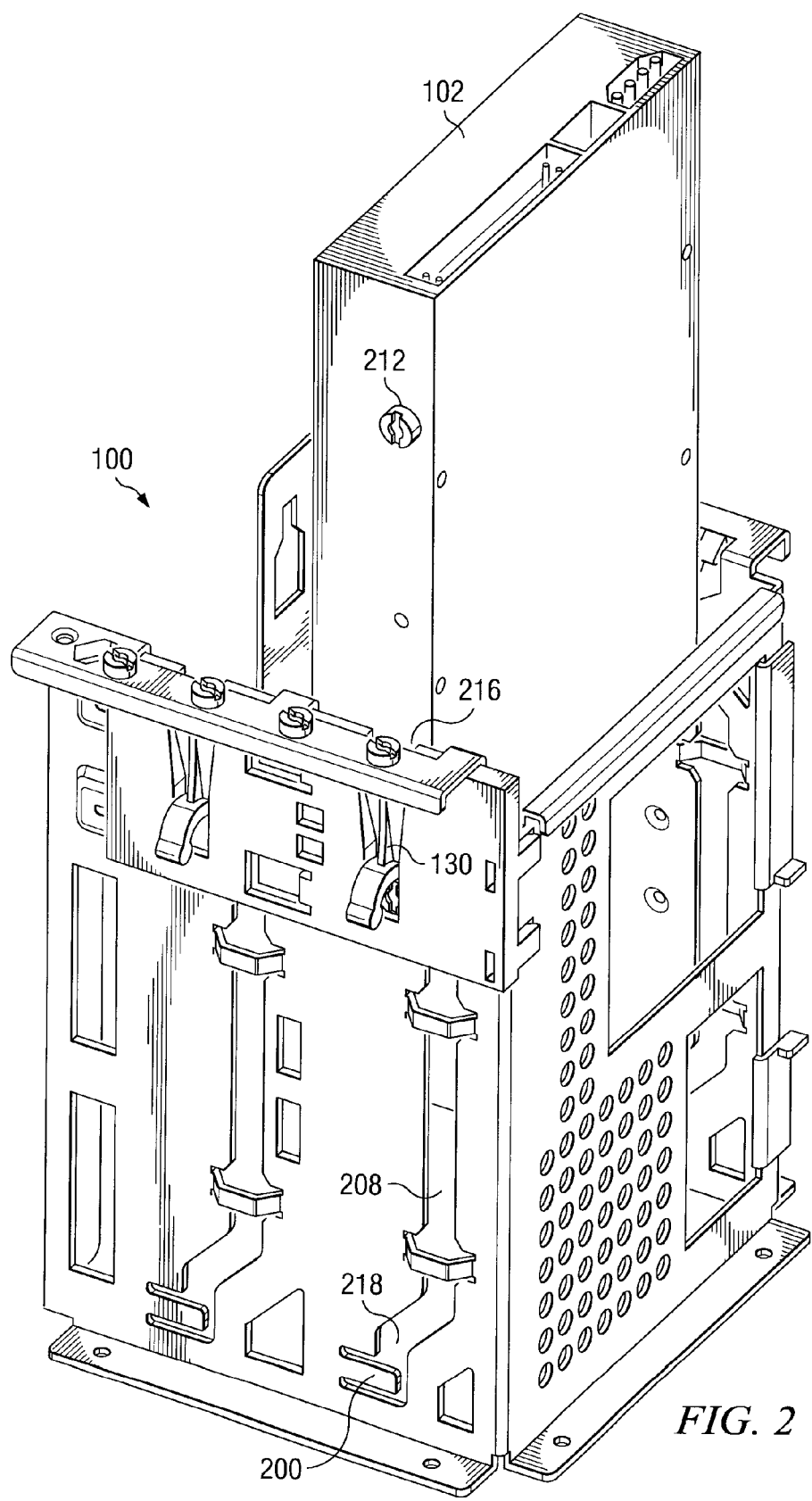
FIGS. 2, 3 and 4 are oblique views of the cage and drive of FIG. 1 wherein the drive is shown in various stages of insertion into the cage.
Figure 3:
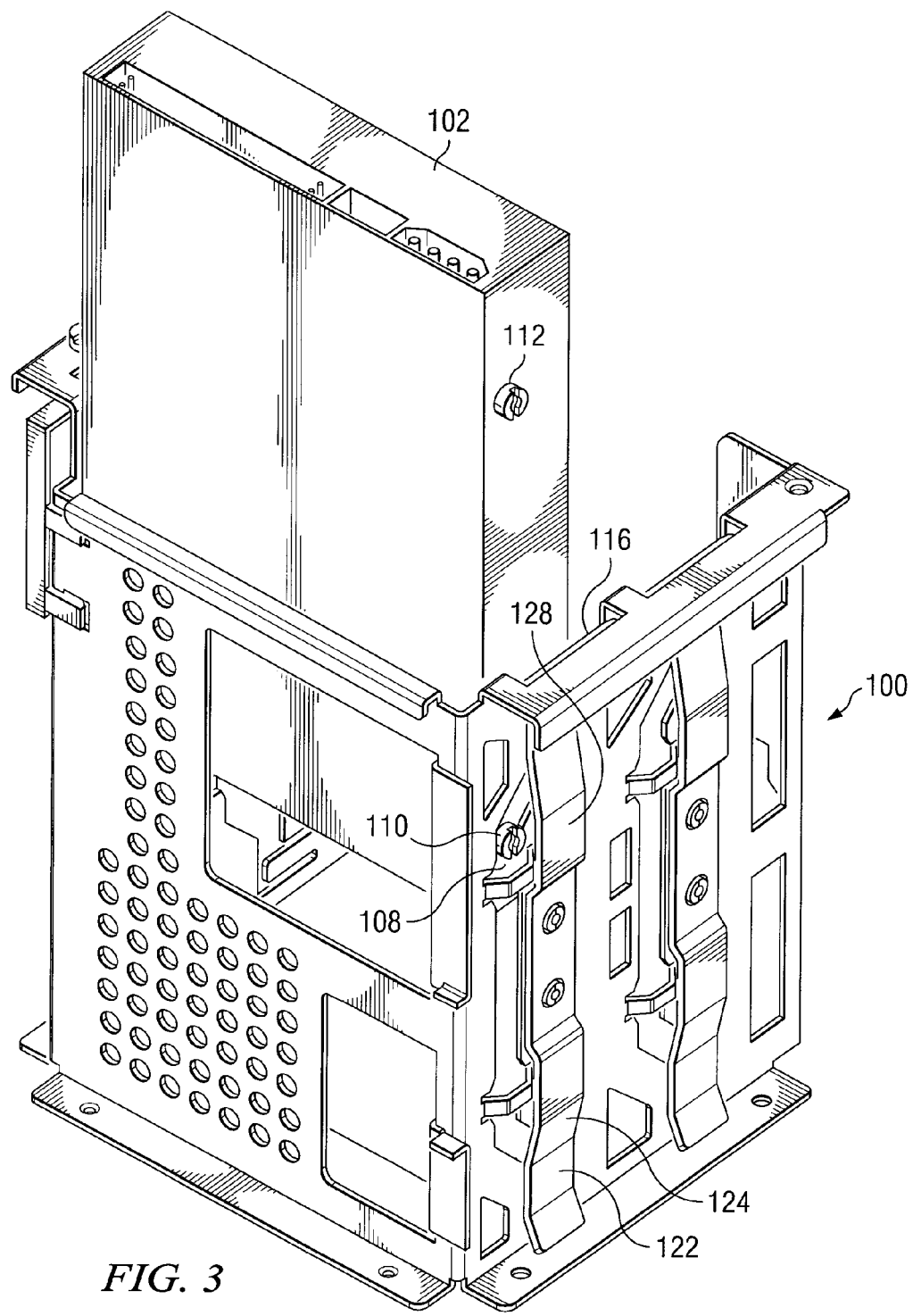
Figure 4:
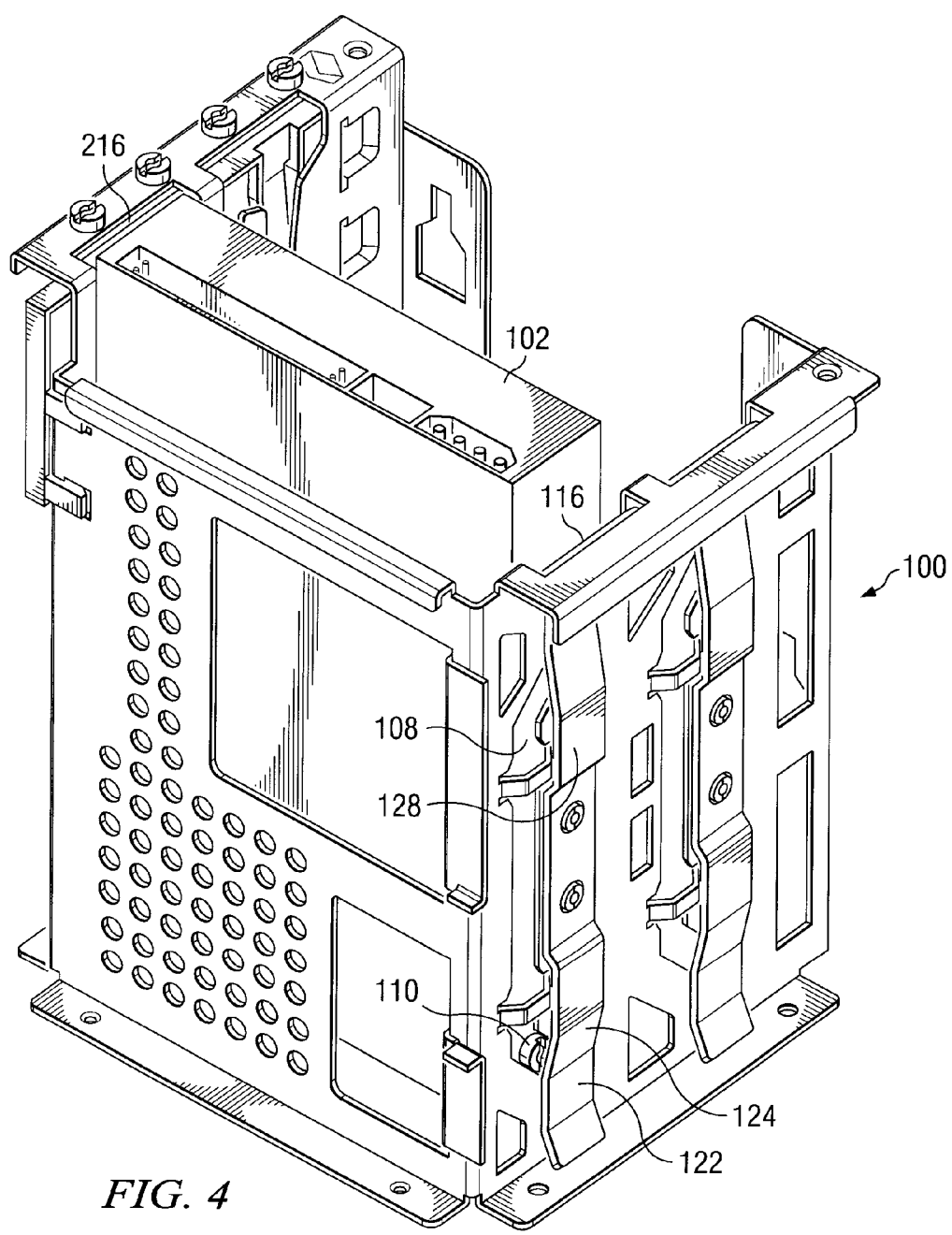
Figure 5:
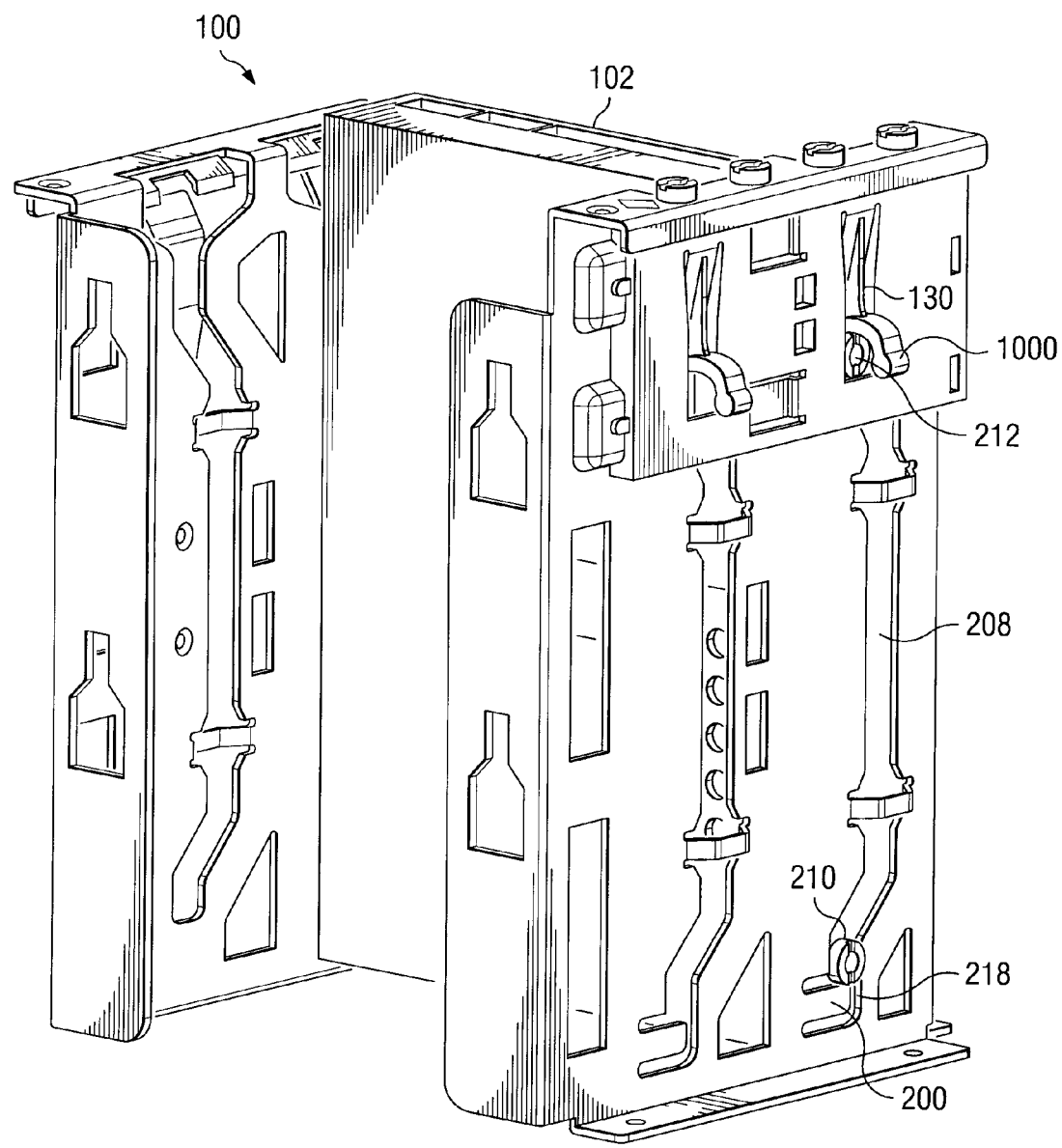
FIGS. 5 and 6 are oblique and side views, respectively, of the cage and drive of FIG. 1 wherein the drive is shown fully inserted into the cage.
Figure 6:
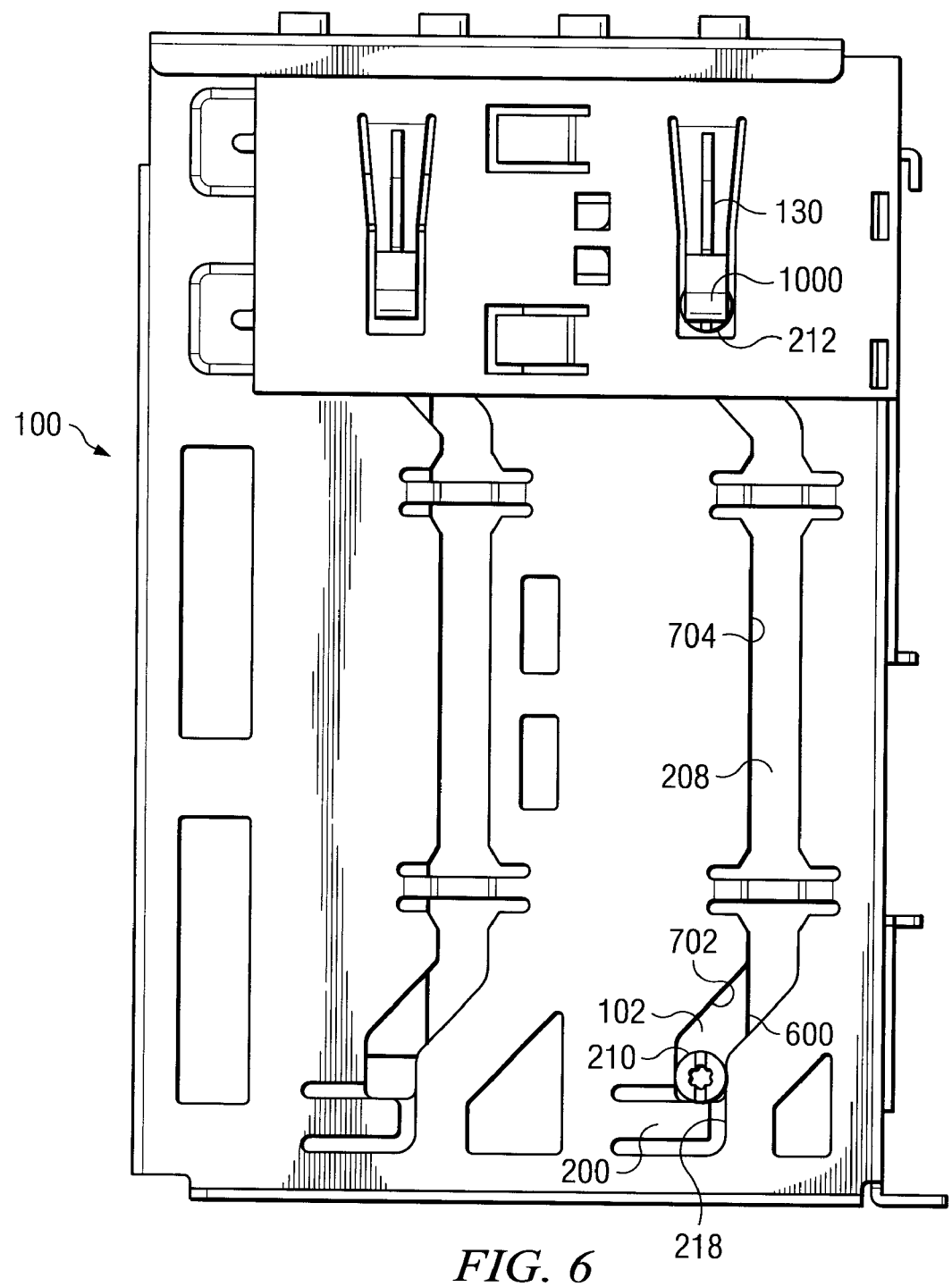
Figure 7:
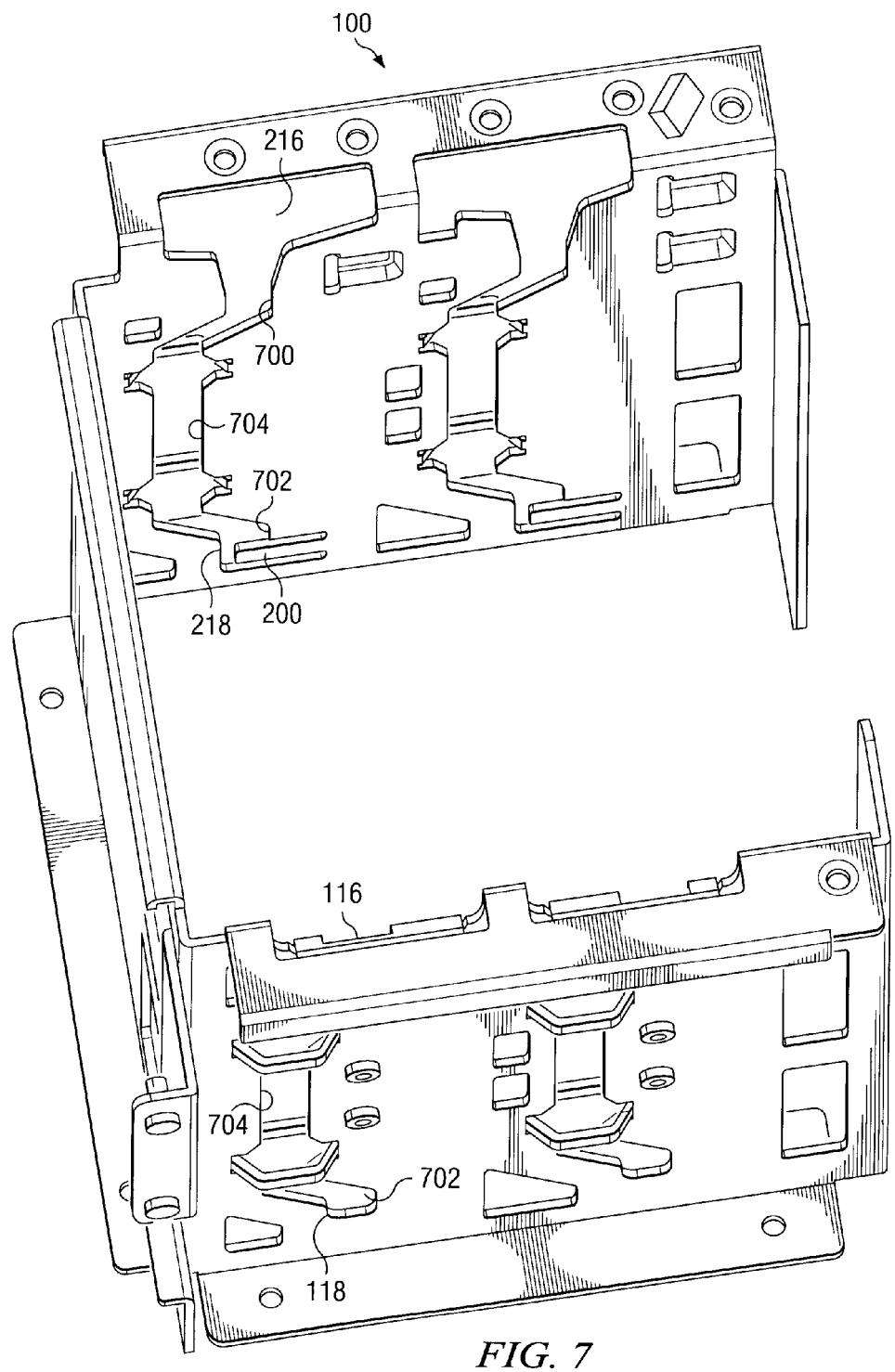
FIGS. 7, 8 and 9 are oblique, left and right side views, respectively, of the cage of FIG. 1 shown without the resilient latches and dual springs of FIG. 1 installed thereon.
Figure 8:
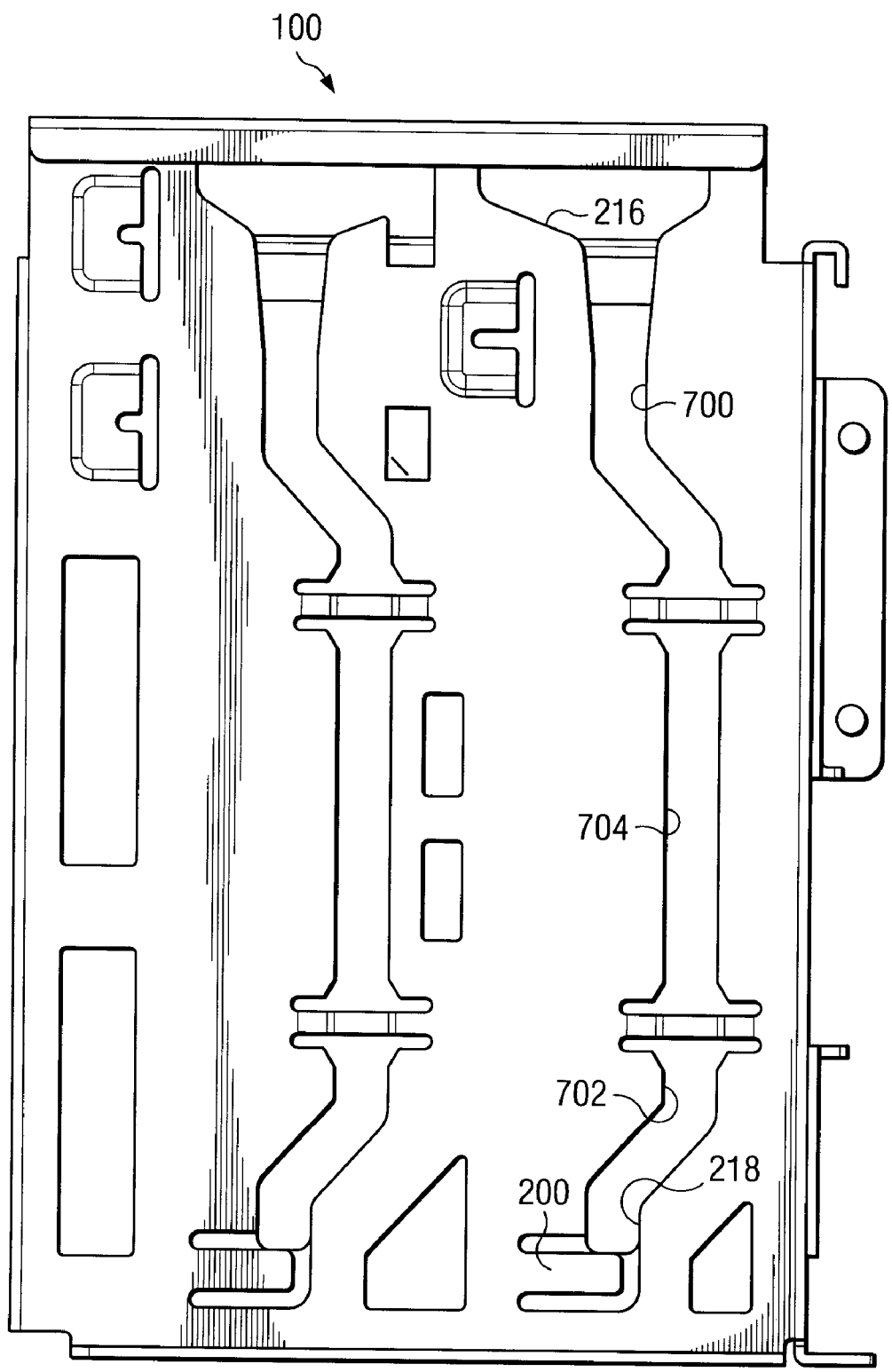
Figure 9:
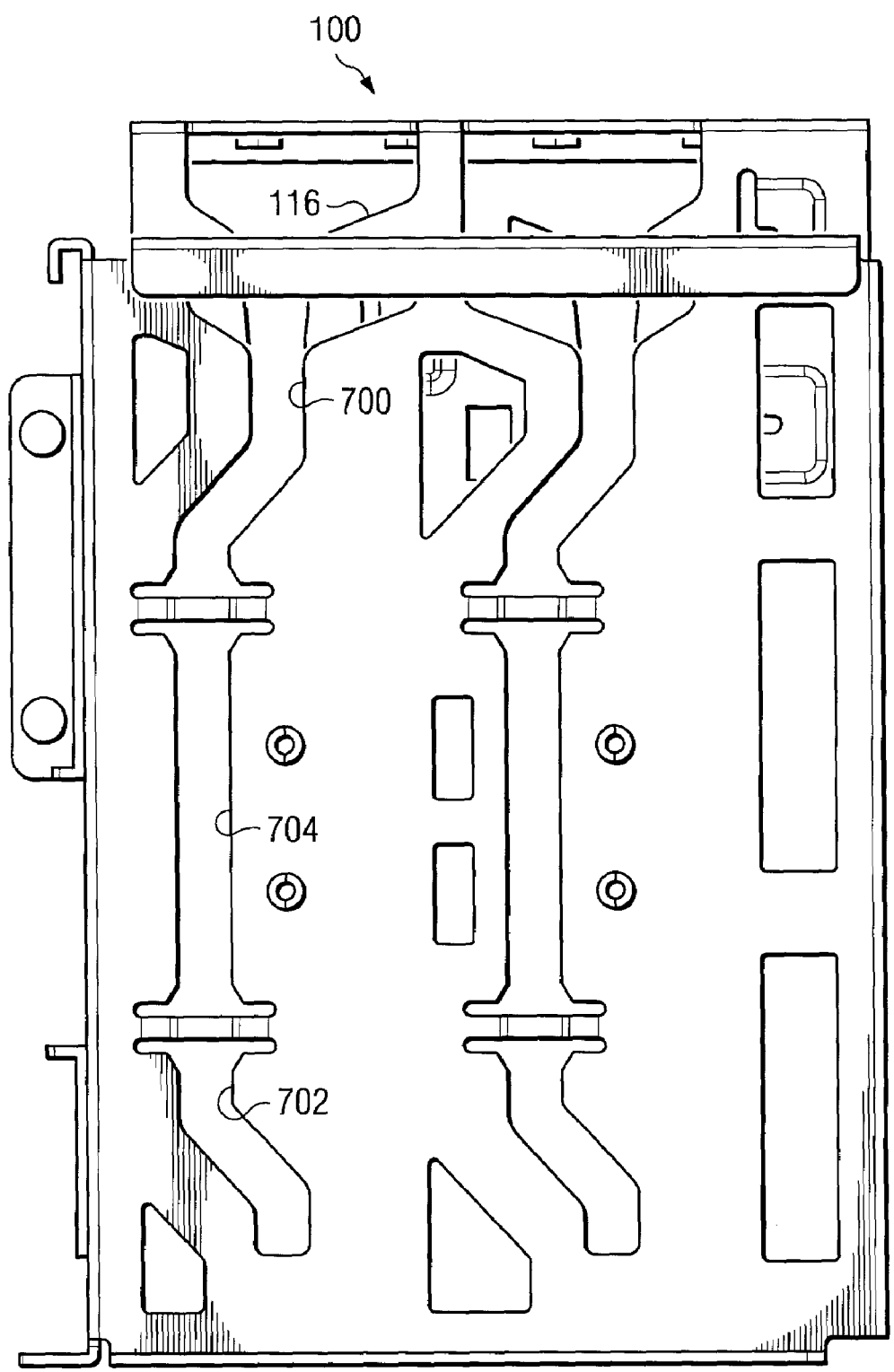

In the embodiment shown, cage 100 has slots on both sides of drive 102. Slot 208 (see FIG. 2) may be formed as a mirror image of slot 108, as shown. To further absorb mechanical shock upon insertion of drive 102 into cage 100, a resilient finger 200 may be disposed at termination 218 of slot 208, or at termination 118 of slot 108, or in both locations. Finger 200 engages protrusion 210 when drive 102 is fully inserted into cage 100, as shown in FIGS. 5 and 6. Finger 200 may be disposed transversely across at least part of the path of protrusion 210, as shown. It may be formed integrally with the material of cage 100. Alternative orientations and means for manufacturing resilient finger 200 may also be employed.

In addition to spring 122, another spring 128 may be disposed adjacent to opening 116 of slot 108. Like spring 122, spring 128 is biased toward slot 108 and is capable of deflecting away from slot 108 in direction 126 responsive to force exerted by protrusions 110, 112. Spring 128 engages protrusion 110 as it enters slot 108, providing some slowing of drive 102 during insertion. Spring 128 engages protrusion 112 not only during drive insertion, but also when drive 102 has been fully inserted into cage 100, thus helping to stabilize the drive and dampen post-installation vibrations.

Figure 15:
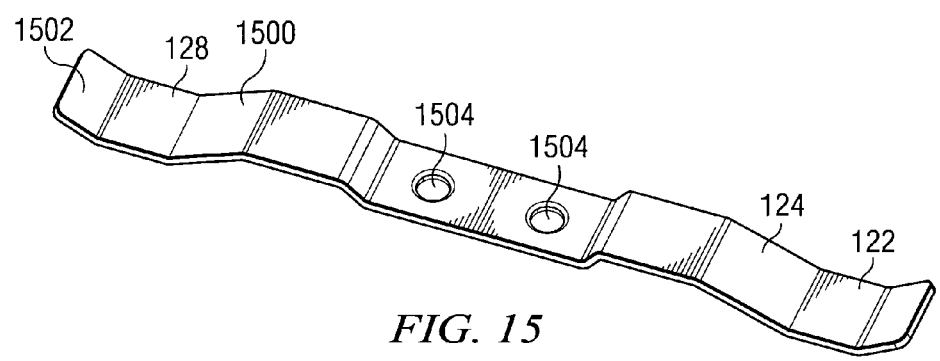
FIGS. 15 and 16 are oblique and side views, respectively, of one of the dual springs of FIG. 1.
Figure 16:
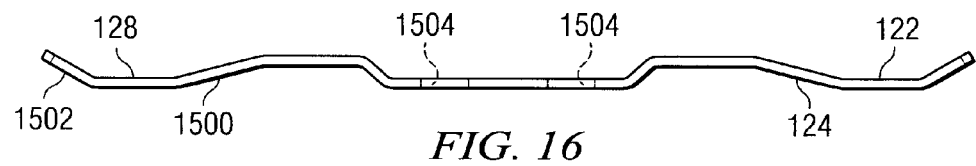
Figure 17:
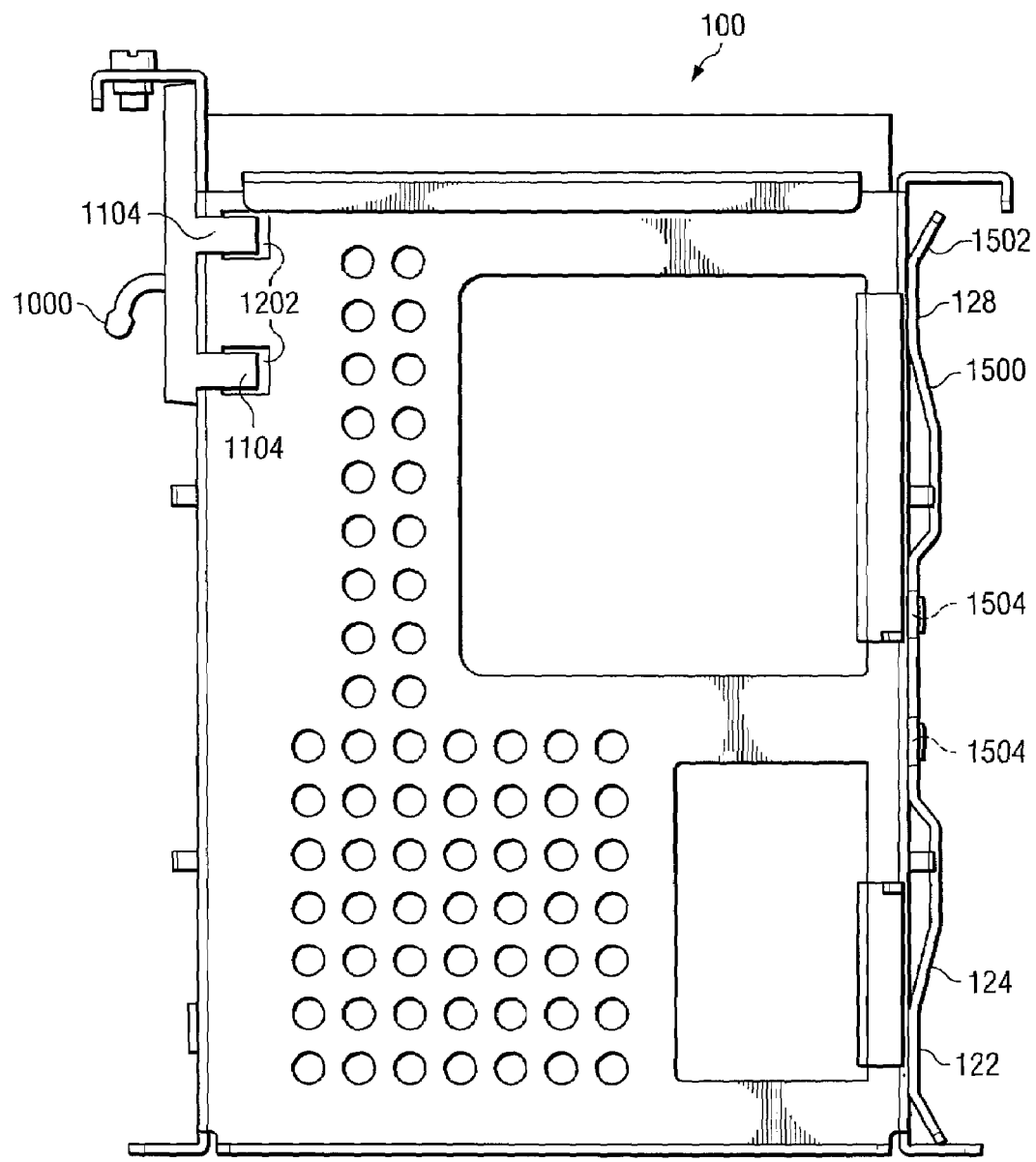
FIG. 17 is a top view of the cage of FIG. 1 shown with the springs of FIG. 15 and 16, and the latches of FIGS. 10 and 11, installed thereon.
Figure 18:
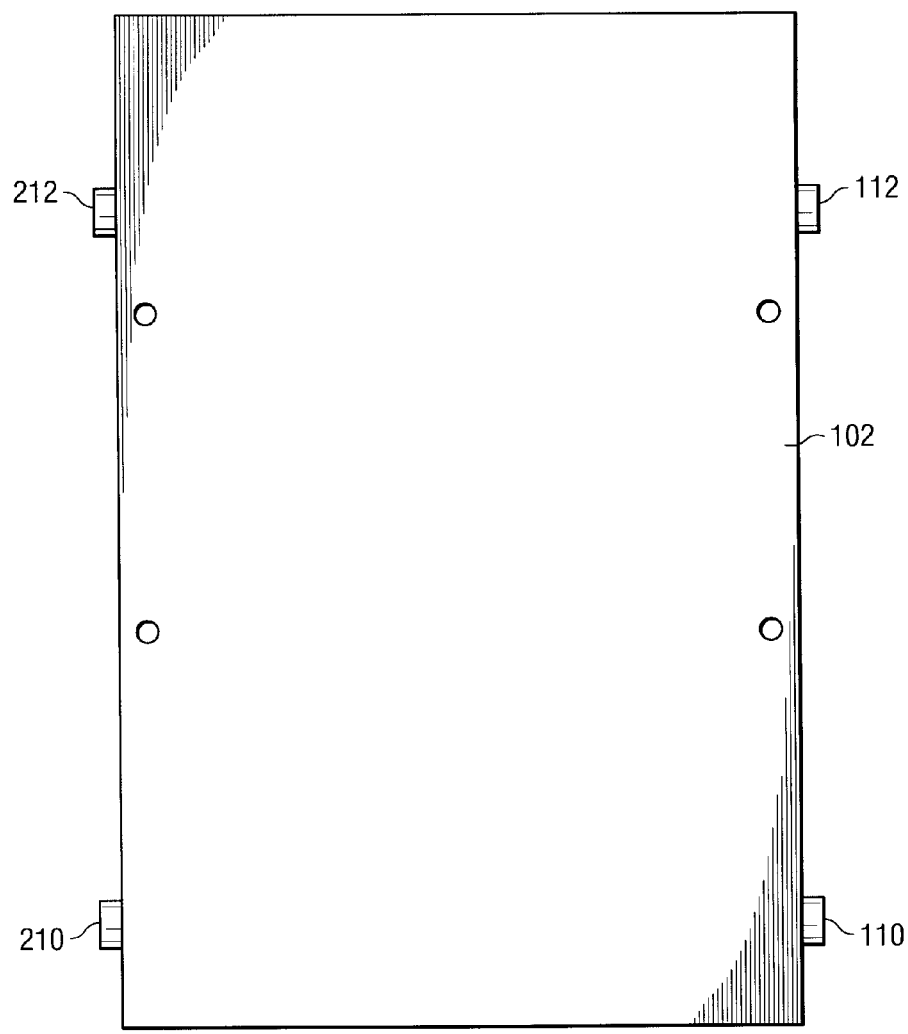
FIGS. 18 and 19 are top and rear views, respectively, of the drive of FIG. 1.
Figure 19:
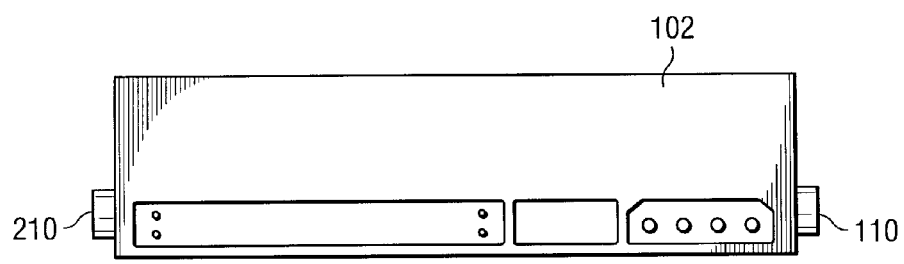

Preferably, spring 128 includes engagement members 1500,1502. (See FIGS. 15–17.) Like engagement member 124, engagement members 1500, 1502 are disposed at least partially in the path of protrusions 110, 112. They may be formed with substantially flat surfaces oriented obliquely to the path of the protrusions. For example, engagement member 1502 may be inclined toward direction of insertion 104, as shown, for engagement with protrusion 110 during drive insertion. And engagement member 1500 may be inclined toward direction of removal 106, as shown, for engagement with protrusion 112 when drive 102 is fully inserted into cage 100 and protrusion 210 is resting against resilient finger 200 at termination 218.

In the illustrated embodiment, springs 128 and 122 are formed integrally from a single piece of metal and thus constitute a "dual" spring. In other embodiments, the springs may be formed separately. If a dual spring is used, the bias of the springs may be created by the pre-loading effect caused when the dual spring is fastened against the side 120 of cage 100 at central fastening points 1504.

Figure 10:
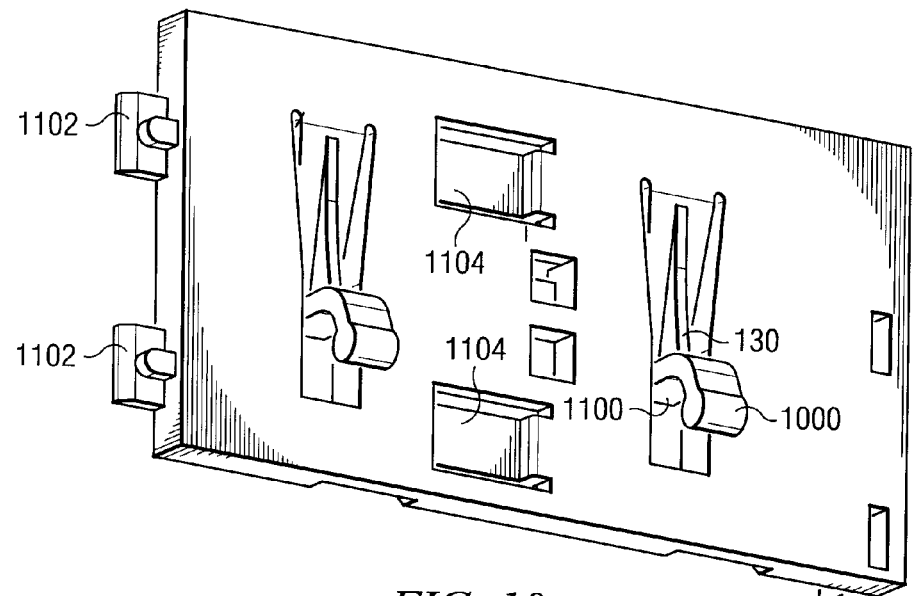
FIGS. 10 and 11 are top and bottom oblique views, respectively, of the resilient latches of FIG. 1.
Figure 11:
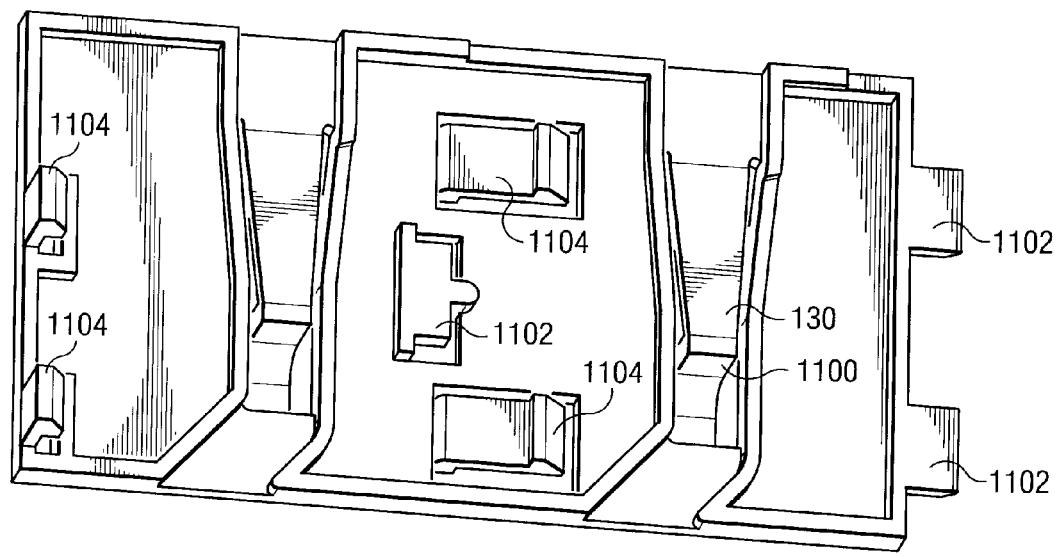

A resilient latch 130 may be disposed adjacent to either slot 108 or 208. Latch 130 should be configured to receive one of the protrusions of drive 102, such as protrusion 212, when protrusion 210 has engaged finger 200 at termination 218. When so engaged, latch 130 should be capable of retaining drive 102 in cage 100. One way of accomplishing this is with a latch design as shown in FIGS. 10 and 11. Latch 130 has a catch 1100 thereon suitable for preventing movement of protrusion 210 in direction 106. For removal of drive 102 from cage 100, latch 130 includes a hook portion 1000. Latch 130 may be disengaged from protrusion 210 by applying a pulling force (as with a finger) to hook portion 1000. Any suitable material may be used to form latch 130 such as, for example, molded plastic. In the embodiment shown, latch 130 is disposed adjacent to an opening 216 of slot 208 because of the location of protrusion 212 on drive 102. If another protrusion of drive 102 were used to engage latch 130, then latch 130 might be located differently.

Figure 12:
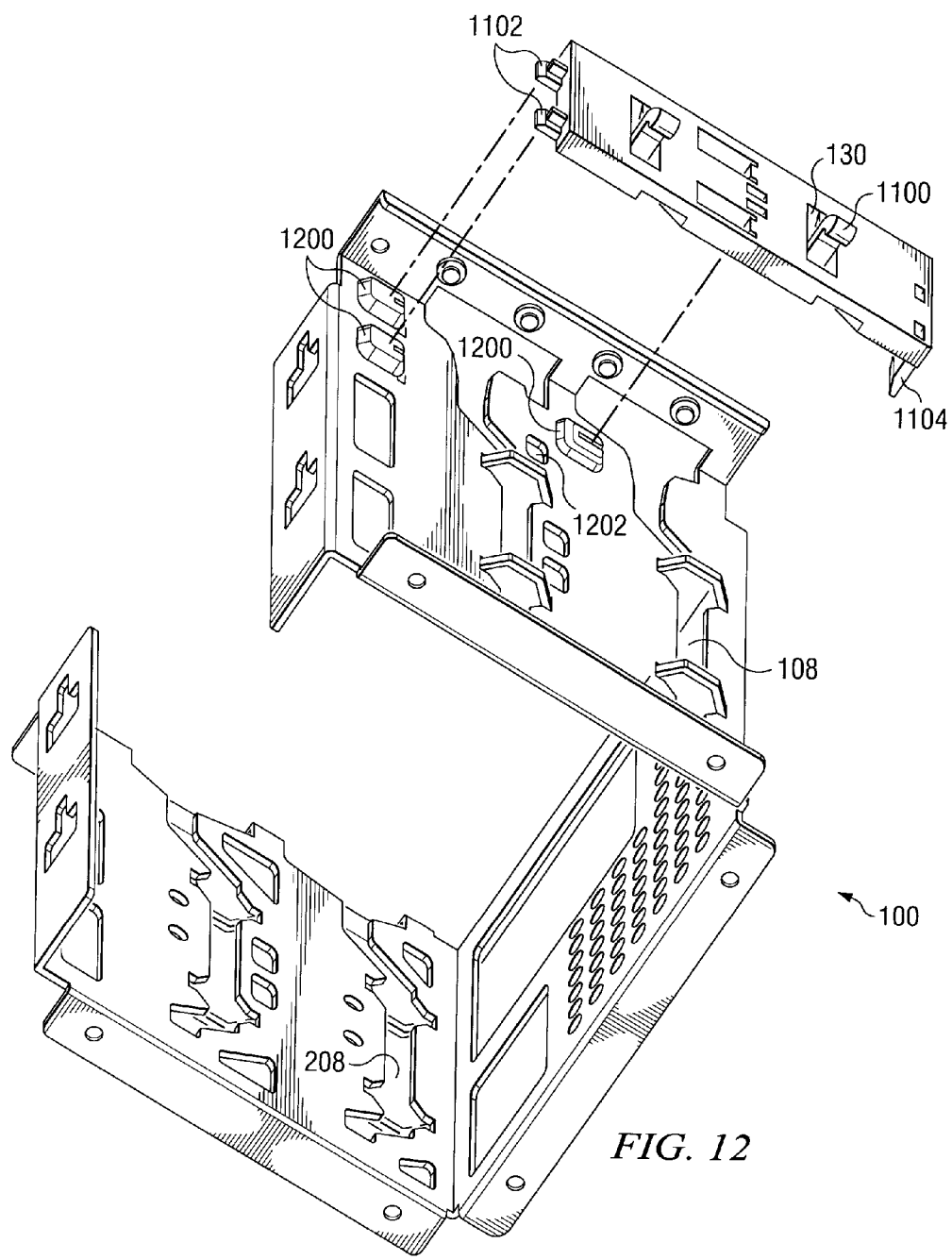
FIGS. 12, 13 and 14 are oblique views illustrating a preferred technique for mounting the resilient latches of FIGS. 10 and 11 to the cage of FIG. 1.
Figure 13:
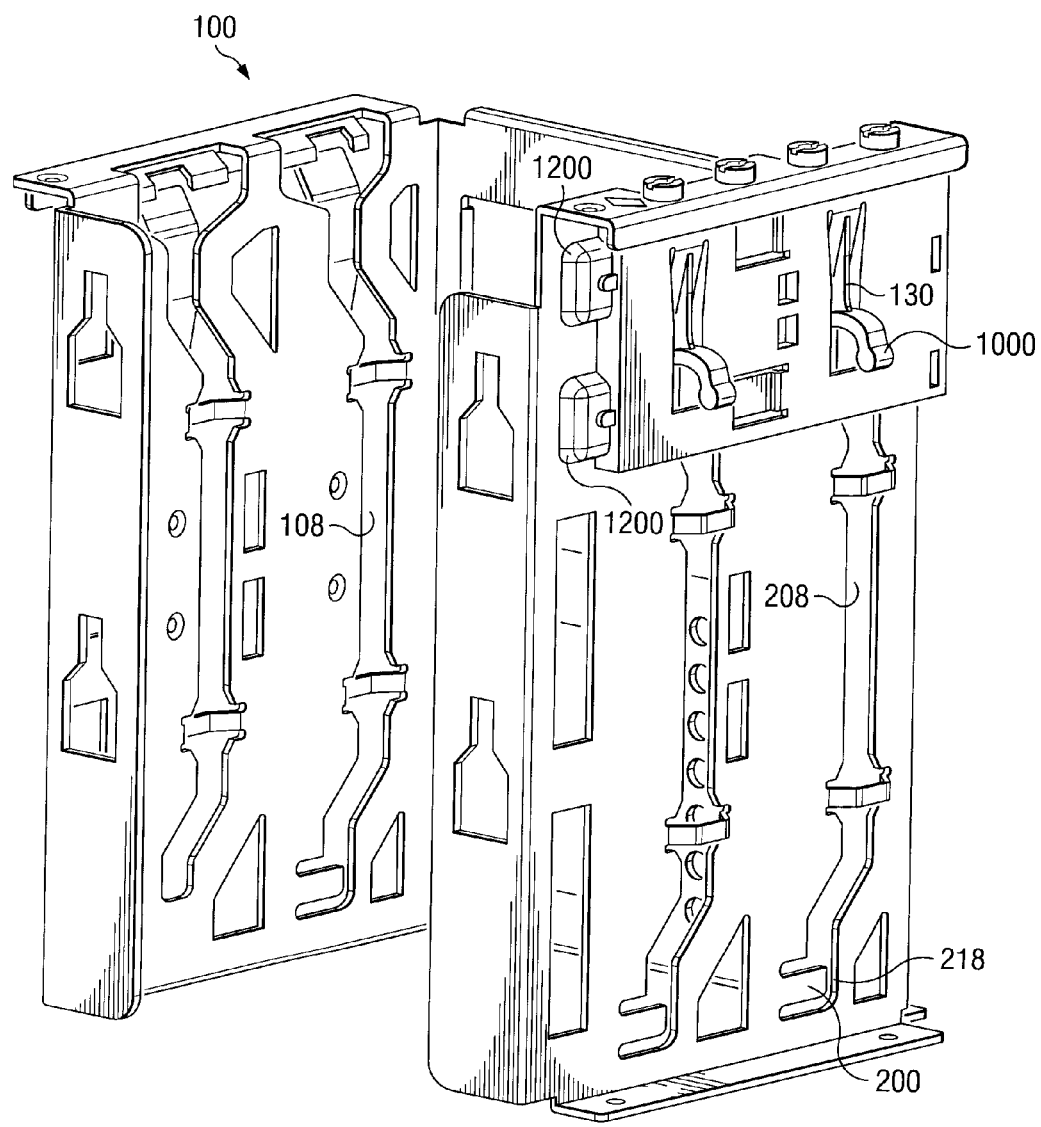
Figure 14:
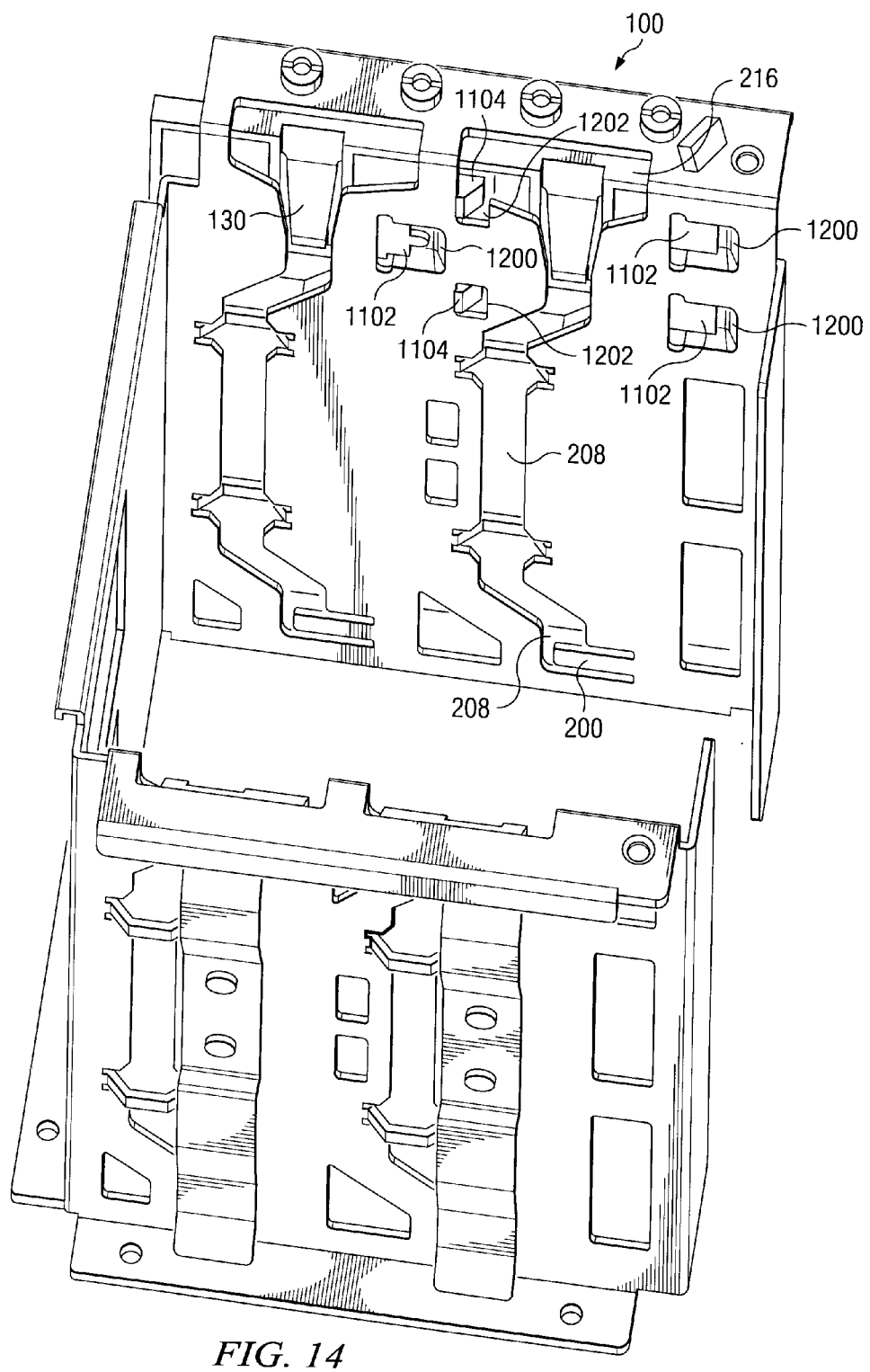

One technique for attaching latch 130 to cage 100 is by means of hooks 1102 and pawls 1104. As shown in FIGS. 12–14, hooks 1102 are designed to engage corresponding ports 1200 formed on cage 100. And pawls 1104 snap into corresponding holes 1202 formed in cage 100 (see FIGS. 12, 14 and 17). Other techniques may also be used to attach latch 130 in a suitable position.

Referring now to FIGS. 6–9, another feature of media drive cage 100 is that slots 108, 208 are nonlinear. In the illustrated embodiment, each slot includes a low section 700 disposed at the opening 116, 216 of the slot. And each slot includes a low section 702 disposed at the termination 118, 218 of the slot. Between the low sections is a high section 704. The height between the high and low sections should be sufficiently large that high section 704 clears the profile 600 of drive 102 when drive 102 rests in its fully engaged position as shown in FIG. 6. In this manner, air may flow into and out of cage 100 through high sections 704 and over the top of drive 102. This air flow facilitates cooling of drive 102 and allows cage 100 to be constructed with fewer air circulation holes, making it more rigid.

While the invention has been described in detail in relation to preferred embodiments thereof, the described embodiments have been presented by way of example and not by way of limitation. It will be understood by those skilled in the art that various changes may be made in the form and details of the described embodiments, resulting in equivalent embodiments that remain within the scope of the appended claims.

We claim:

1. A media drive cage, comprising:
   a first slot defined by top and bottom bearing surfaces and having an opening and a termination, configured to receive a first protrusion of a media drive, and defining a plane of movement for the first protrusion as it travels along a path through the first slot from the opening to the termination; and
   a first spring disposed adjacent to the termination and operable to engage the first protrusion before it reaches the termination; wherein
   the first slot comprises first and second low sections at the opening and the termination, respectively, and a high section between the low sections, the bottom bearing surface in the low sections defining a first height and the bottom bearing surface in the high section defining a second height higher than the first height; and wherein
   the difference between the first and second heights is sufficiently large that the high section clears the profile of the media drive when the media drive is fully inserted in the cage such that air may flow through the high section into or out of the cage, unimpeded by the media drive.

2. The media drive cage of claim 1, wherein:
   the first spring comprises a first engagement member, disposed at least partially in the path, for engaging the first protrusion; and
   the first engagement member is biased toward the slot and is operable to deflect away from the slot in a direction orthogonal to the plane of movement in response to force applied by the first protrusion.

3. The media drive cage of claim 2, wherein:
the first engagement member comprises a substantially flat surface oriented to the path obliquely.

4. The media drive cage of claim 1, wherein:
the first protrusion comprises a screw head.

5. The media drive cage of claim 1, further comprising:
a resilient finger, disposed at the termination, for engaging the first protrusion.

6. The media drive cage of claim 5, wherein:
the resilient finger is disposed transversely across at least part of the path.

7. The media drive cage of claim 5, wherein:
the resilient finger is formed integrally with the material of the media drive cage.

8. The media drive cage of claim 1, further comprising:
a second spring disposed adjacent to the opening and operable to engage the first protrusion as it enters the first slot.

9. The media drive cage of claim 8, wherein:
the second spring comprises second and third engagement members, disposed at least partially in the path, for engaging the first protrusion and a second protrusion of the media drive; and
the second and third engagement members are biased toward the slot and are operable to deflect away from the slot in a direction orthogonal to the plane of movement in response to force applied by the first and second protrusions.

10. The media drive cage of claim 9, wherein:
the second and third engagement members comprise substantially flat surfaces oriented to the path obliquely, the second engagement member inclined toward a media drive insertion direction and the third engagement member inclined toward a media drive removal direction.

11. The media drive cage of claim 9, wherein:
the third engagement member engages the second protrusion when the first protrusion engages the termination.

12. The media drive cage of claim 9, wherein:
the first and second springs are integrally formed from a single piece of metal.

13. The media drive cage of claim 1, further comprising:
a second slot configured to receive a second protrusion of the media drive; and
a resilient latch disposed adjacent to the second slot, operable to engage the second protrusion when the first protrusion engages the termination, and operable to retain the media drive in the media drive cage when so engaged.

14. The media drive cage of claim 13, further comprising:
a resilient finger, disposed at a termination of the second slot, for engaging a third protrusion of the media drive.

15. The media drive cage of claim 13, wherein:
the resilient latch comprises molded plastic.

16. The media drive cage of claim 13, wherein:
the resilient latch comprises a hook portion and is operable to disengage from the second protrusion in response to a pulling force applied to the hook portion.

17. The media drive cage of claim 13, wherein:
the resilient latch is disposed adjacent to an opening of the second slot.

18. The media drive cage of claim 1, further comprising:
means for latching the media drive in the media drive cage.

19. The media drive cage of claim 1, wherein the media drive cage comprises more than one identical media drive bays.

\* \* \* \* \*